(12) United States Patent
Schrumpf

(10) Patent No.: US 11,287,051 B2
(45) Date of Patent: Mar. 29, 2022

(54) FLOAT VALVE

(71) Applicant: FROETEK VERMOEGENSVERWALTUNG GMBH, Osterode Am Harz (DE)

(72) Inventor: Harald Schrumpf, Wutha-Farnroda (DE)

(73) Assignee: FROETEK VERMOEGENSVERWALTUNG GMBH, Osterode am Harz (DE)

( * ) Notice: Subject to any disclaimer, the term of this patent is extended or adjusted under 35 U.S.C. 154(b) by 103 days.

(21) Appl. No.: 16/569,674

(22) Filed: Sep. 13, 2019

(65) Prior Publication Data
US 2020/0088316 A1    Mar. 19, 2020

(30) Foreign Application Priority Data
Sep. 19, 2018   (DE) ..................... 10-2018-007-379.4

(51) Int. Cl.
| | |
|---|---|
| *F16K 31/20* | (2006.01) |
| *F16H 57/04* | (2010.01) |
| *F16K 27/02* | (2006.01) |
| *F16K 33/00* | (2006.01) |
| *F16K 31/22* | (2006.01) |

(52) U.S. Cl.
CPC ......... *F16K 31/20* (2013.01); *F16H 57/0447* (2013.01); *F16H 57/0449* (2013.01); *F16K 27/0245* (2013.01); *F16K 33/00* (2013.01); *F16H 57/0402* (2013.01); *F16H 57/045* (2013.01); *F16K 31/22* (2013.01)

(58) Field of Classification Search
CPC .......... F16K 31/20; F16K 31/22; F16K 33/00; F16K 27/0245; F16H 57/049; F16H 57/045; F16H 57/0402; F16H 57/0447
See application file for complete search history.

(56) References Cited

U.S. PATENT DOCUMENTS

| | | | | |
|---|---|---|---|---|
| 1,982,555 | A * | 11/1934 | Van Der Horst ....... | E03F 5/042 210/119 |
| 3,061,104 | A * | 10/1962 | Johnf ..................... | B01D 35/26 210/172.3 |
| 3,776,255 | A * | 12/1973 | Fujiwara ............... | F24D 19/087 137/202 |
| 4,132,238 | A * | 1/1979 | Clark ................. | B01D 17/0214 137/172 |
| 5,101,936 | A * | 4/1992 | Paredes ................... | F01M 1/12 123/196 S |
| 5,201,340 | A * | 4/1993 | Teepe .................. | B65D 88/747 137/315.01 |

FOREIGN PATENT DOCUMENTS

| | | |
|---|---|---|
| DE | 2 206 791 A1 | 8/1972 |
| DE | 2929459 C2 | 5/1983 |

\* cited by examiner

*Primary Examiner* — Daphne M Barry
*Assistant Examiner* — Patrick C Williams
(74) *Attorney, Agent, or Firm* — Norman B. Thot

(57) ABSTRACT

A float valve for controlling a liquid level includes a valve main body which forms a throughflow duct, a valve narrowing which is formed by the throughflow duct, and a float mounted above the valve narrowing as a valve element. The valve element is freely movable, closes the valve narrowing via its weight, and is lifted from a valve closing position via a liquid. The float has a low center of gravity so that the float always rights itself to a standing position.

10 Claims, 5 Drawing Sheets

FLOAT VALVE

CROSS REFERENCE TO PRIOR APPLICATIONS

Priority is claimed to German Patent Application No. DE 10 2018 007 379.4, filed Sep. 19, 2018. The entire disclosure of said application is incorporated by reference herein.

FIELD

The present invention relates to a float valve for controlling a liquid level, in particular an oil level, in particular of a vehicle transmission.

BACKGROUND

The use of a float-controlled valve to provide a particular fill level for regulating the oil level of an oil sump, such as of a transmission, has previously been described. The float is fastened to a lever which actuates the valve element. From a particular, low, fill level, the float is lowered so that the valve closes and further oil can no longer flow out. Such float valves do not operate in a fault-free manner since the lever and the float can jam or become caught.

SUMMARY

An aspect of the present invention is to provide an improved float valve of the type mentioned above which provides a high functional reliability.

In an embodiment, the present invention provides a float valve for controlling a liquid level which includes a valve main body which forms a throughflow duct, a valve narrowing which is formed by the throughflow duct, and a float mounted above the valve narrowing as a valve element. The valve element is configured to be freely movable, to close the valve narrowing via its weight, and to be lifted from a valve closing position via a liquid. The float comprises a low center of gravity so that the float always rights itself to a standing position.

BRIEF DESCRIPTION OF THE DRAWINGS

The present invention is described in greater detail below on the basis of embodiments and of the drawings in which.

DETAILED DESCRIPTION

Figure 1:
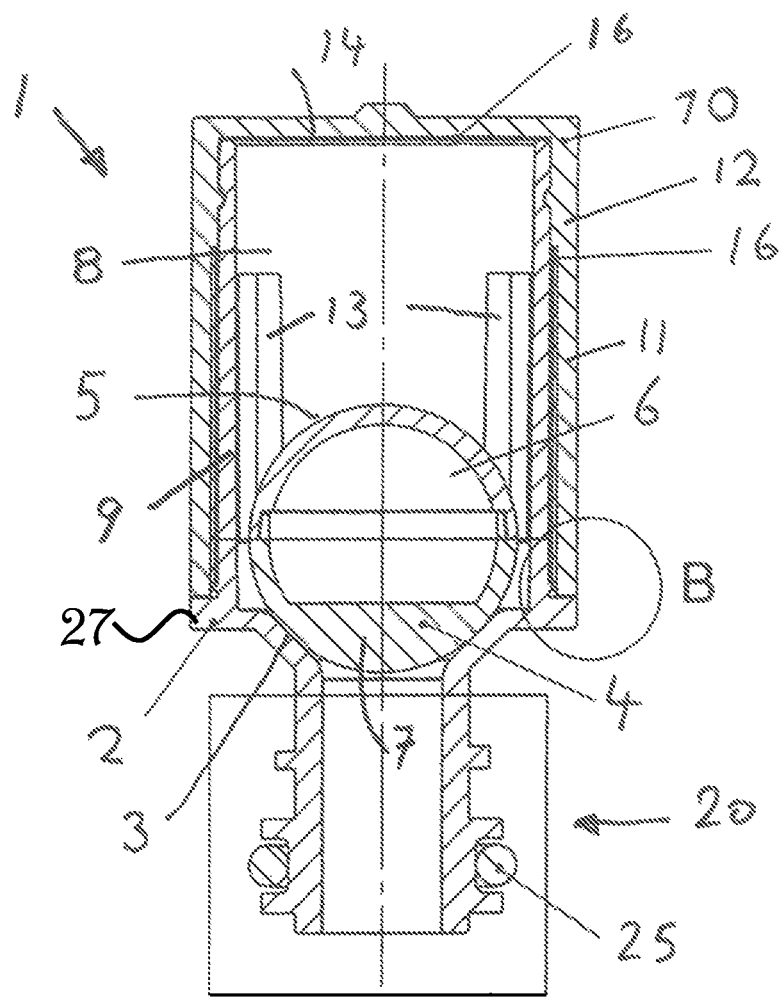
FIG. 1 shows an axial section through the float valve with spherical float according to A-A in FIG. 3.
Figure 2:
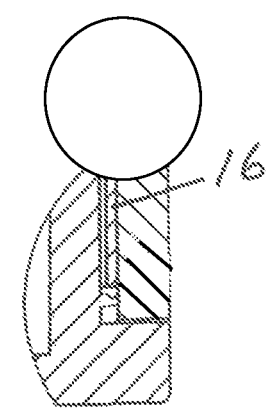
FIG. 2 shows the enlarged detail B in FIG. 1.
Figures 3, 4:
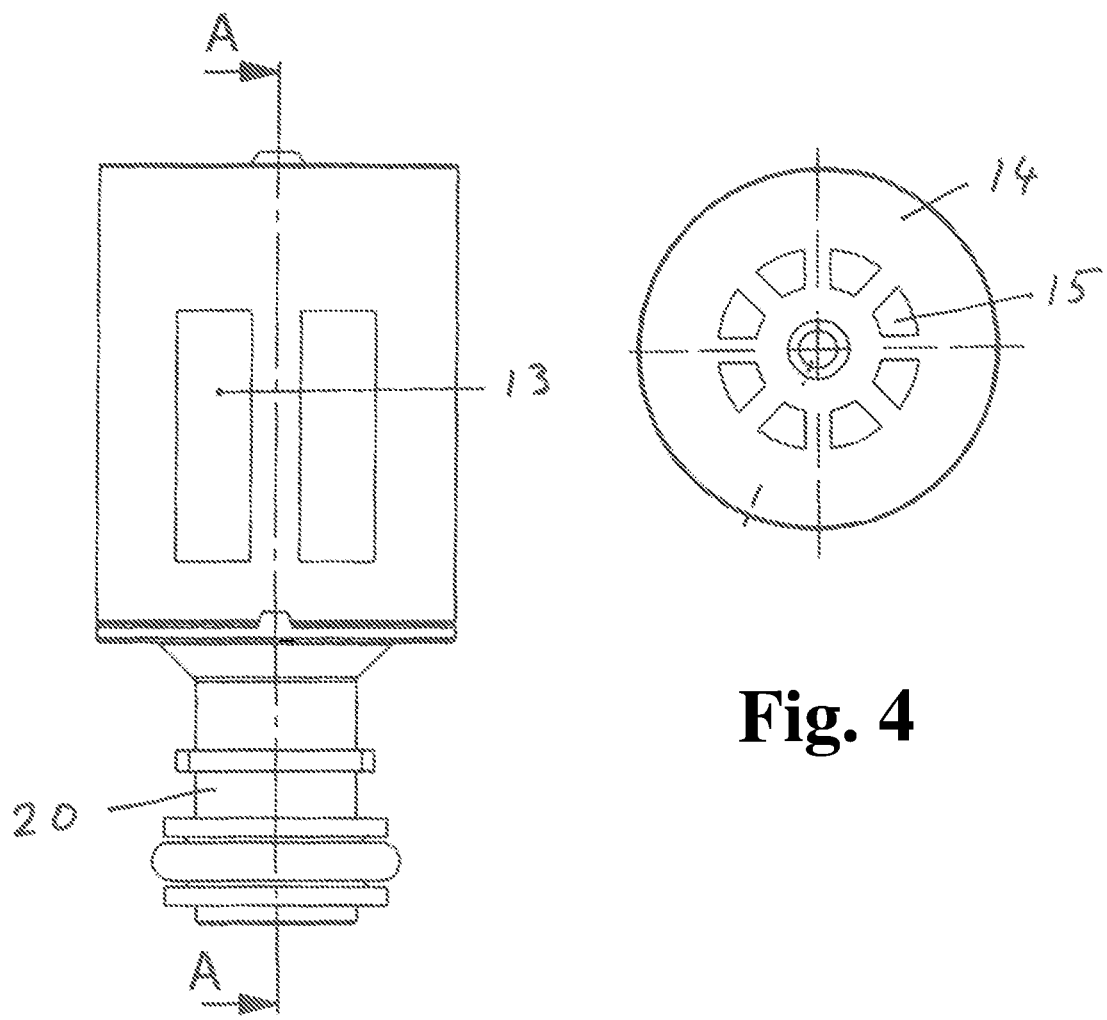
FIG. 3 shows a side view of the float valve.
FIG. 4 shows an end view of the float valve.

In an embodiment, the present invention provides a valve main body, which forms a throughflow duct, and a valve narrowing, which is formed by the throughflow duct and above which a float is mounted as a freely movable valve element, the valve element closing the valve narrowing as a result of its weight and being able to be lifted from this closed position by the liquid, wherein the float has such a low center of gravity that it always rights itself to a standing position again. The float hereby has a spherical, hemispherical or sphere-like outer wall.

For such a freely movable float, no component required for guidance, such as a lever, is necessary. A jamming, catching or some other disruptive process for a reliable functioning is thus excluded. The positionally oriented valve element also provides the closing function by way of accumulation of material or an element or component that produces the accumulation of material. The float valve is here suitable for use with liquid and gaseous media.

The float valve operates maintenance-free. Impurities which are present in the through-flowing medium and which could accumulate upon closure are entrained by the volume stream after the next opening of the valve. The grain size of the impurity is thereby not crucial.

The float valve also operates maintenance-free and reliably because, owing to the geometry of the float, whether it be a hollow sphere, a hollow sphere with positional orientation, or an assembled float with sphere-like geometry, it is not possible for adhesion forces and cohesion forces to impair the functioning thereof. The planer arrangement of the bodies with respect to each other is too small therefor. The buoyancy of the through-flowing medium flowing at the same time counteracts the adhesion force and cohesion force. The float can, for example, have a spherical, a hemispherical, a sphere-like, or a conical outer wall.

In an embodiment, the float can, for example, have a cavity above that quantity of float material in which the center of gravity is situated. The float may also be assembled from two shells, of which the lower shell contains the center of gravity.

In an embodiment, the inner wall of the valve narrowing can, for example, be of a conical or of a convex form.

A design which is advantageous in terms of production, assembly and maintenance is provided if the valve chamber which accommodates the float is formed by a vertical tube connecting piece above whose upper opening a tubular hood, which sealingly surrounds the tube connecting piece on the outside, is seated via an abutment on a flange of the valve main body.

In an embodiment, the wall of the tube connecting piece and the wall of the hood can, for example, have liquid passage openings, in particular in the form of windows. The upper roof wall of the tubular hood may also have liquid passage openings with filter surfaces. Such a use as a float filter valve improves the reliability of the sealing since no impurities can reach the contact surfaces. A filter fabric, which can be metallic or non-metallic, organic or inorganic, is required therefor. Use of the filter, however, limits the freedom from maintenance of the system, albeit not the functionality, since the negative pressure for contacting and thus the sealing continues to prevail or could prevail.

Exemplary embodiments of the present invention are shown in the drawings which are explained in greater detail below.

The float valve 1 has a rotationally symmetrical valve main body 2 having a flange 27 arranged on the outside thereof, the valve main body 2 forms a throughflow duct with an upper tubular valve chamber 8, and has a tubular connecting piece 20, which downwardly adjoins the valve chamber 8 in a coaxial manner and whose inner diameter is smaller than the inner diameter of the valve chamber 8, with the result that the transition from the valve chamber 8 to the connecting piece 20 forms a valve narrowing 3 as a valve seat. Situated in the valve chamber 8 is a freely movable spherical float 4, which is spherical on the outside via a spherical outer wall 5, and whose outer diameter is only slightly smaller than the inner diameter of the valve chamber 8, with the result that the spherical float 4 is guided so as to be vertically movable through the valve chamber 8. An annular seal 25 is situated on the outer side of the connecting piece 20.

The float valve 1 closes from a particular liquid level lower limit, in particular an oil level lower limit, with the result that there always remains a sufficiently large quantity of liquid in the storage container, in particular a quantity of oil in the oil reservoir.

The spherical float 4 has an upper cavity 6 and a lower accumulation of material as a lower quantity of float material 7, by way of which the spherical float 4 has such a low center of gravity that, floating on the liquid surface or the gas surface, it always rights itself to a standing position so that the center of gravity is situated downwards and thus at all times only the lower outer region of the float comes into abutment with the valve seat 3.

The upper tubular valve chamber 8 is formed by a tubular tube connecting piece 9 which is covered by a pot-like, coaxial hood 10. Hood 10 has a cylindrical side wall 11 which has a cylindrical inner wall 12. Hood 10 closes off the valve chamber 8 towards the top and abuts closely and in a liquid-tight and/or gas-tight manner, via its cylindrical inner wall 12, against the outer wall 5 of the tube connecting piece 9, whereby a bottom part of the cylindrical side wall abuts on the flange 27 of the valve main assembly 2. Situated in the cylindrical side wall 11 of the hood 10, in the cylindrical wall of the tubular tube connecting piece 9 and in the upper roof wall 14 or the upper base of the hood 10 are windows 13, 15 through which the liquid or the gas is able to flow, i.e., as liquid throughflow areas. The windows/liquid throughflow areas 13, 15 are covered by filter surfaces 16.

Figure 7:
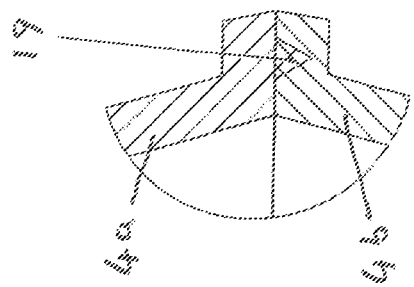
FIG. 7 shows the enlarged detail B in FIG. 6.
Figure 6:
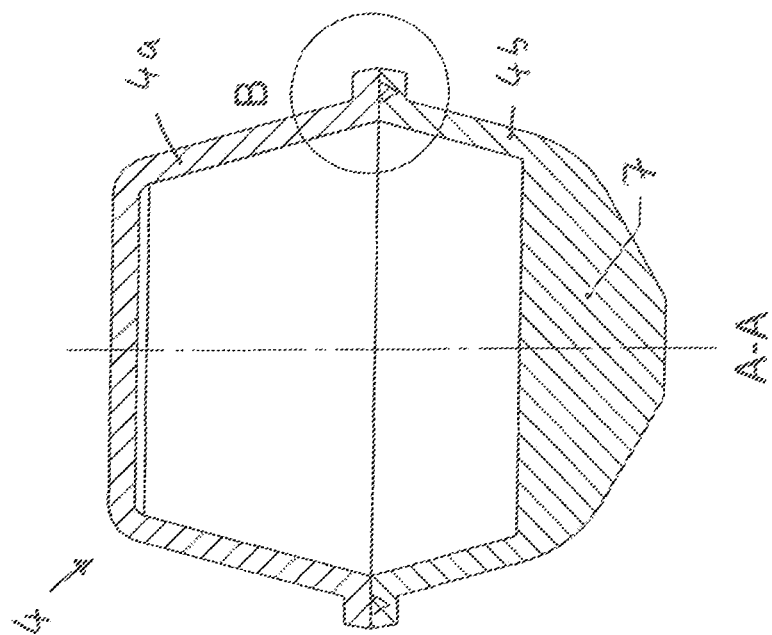
FIG. 6 shows an axial section through the second embodiment of the float.
Figure 5:
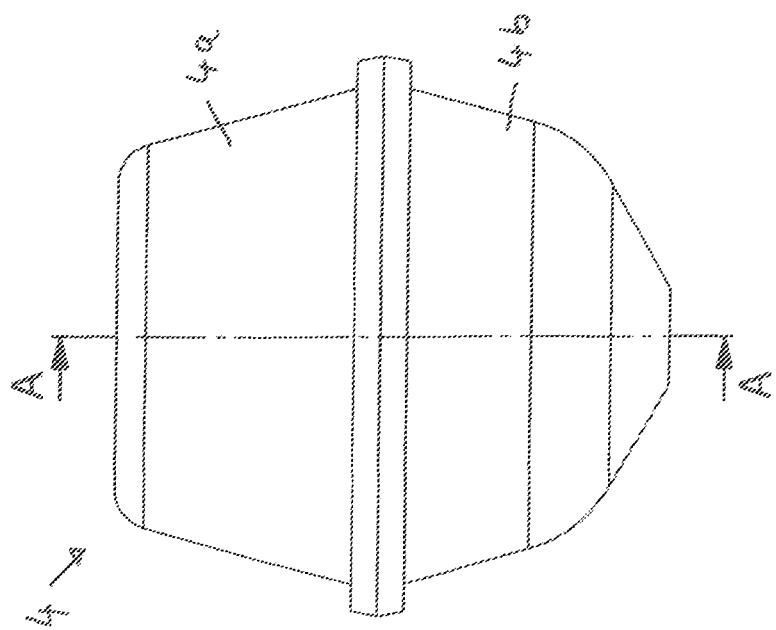
FIG. 5 shows a side view of a second embodiment of the float.

The spherical float 4 is assembled from two half-shells 4a, 4b, wherein the half-shells are each hemispherical on the outside, as illustrated in FIG. 1, or are frustoconical on the outside, as illustrated in FIGS. 5 and 6. The half-shells 4a, 4b hereby each form on their fastening boundary an annular flange for fastening the flanges to one another. A weld seam 19 (FIG. 7) or an adhesive bond provides retention.

Figure 8:
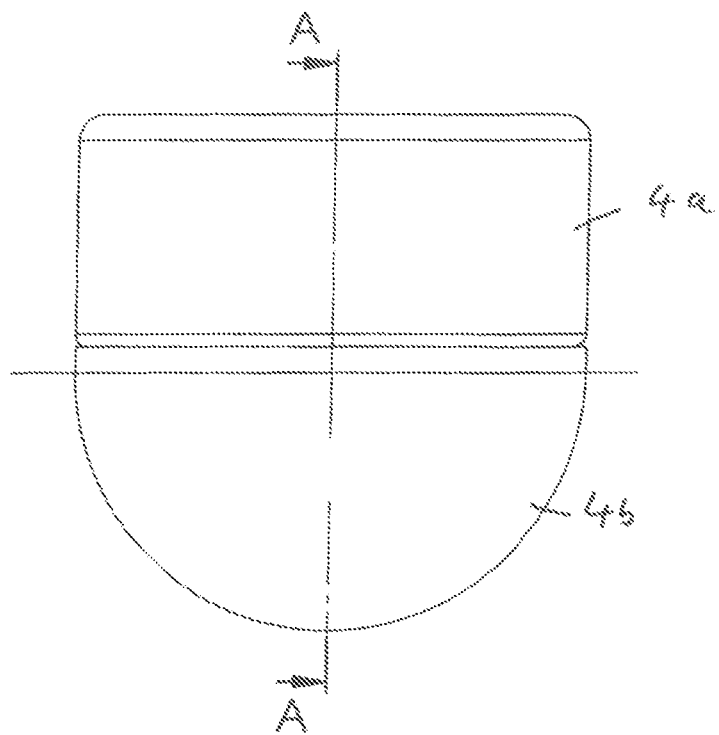
FIG. 8 shows a side view of a third embodiment of the float.
Figure 9:
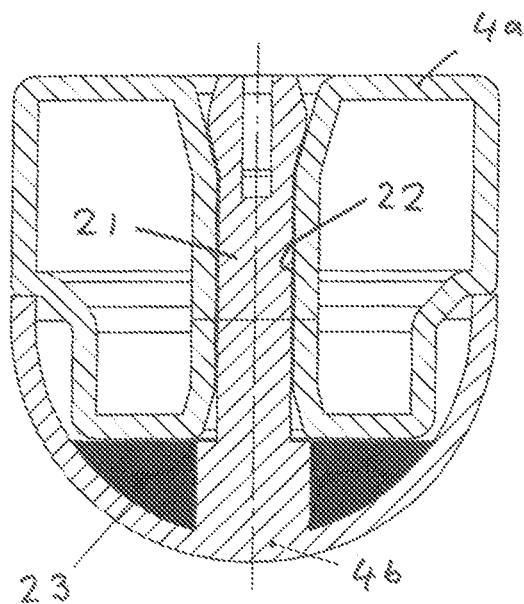
FIG. 9 shows an axial section through the third embodiment of the float.

In the embodiment of the spherical float 4 that is illustrated in FIGS. 8 and 9, the lower shell 4b has a hemispherical outer side and a central coaxial vertical fastening pin 21 which is seated with an accurate fit in a form- and/or force-fitting manner in a central, duct-like recess 22 of the upper shell 4a. The upper shell 4a hereby has a cylindrical outer shape or a convex outer shape (which is not illustrated).

Situated on the bottom of the lower shell 4b as a ballast is a metallic annular part 23 composed of metal, via which the low center of gravity of the spherical float 4 is formed.

The spherical float 4 operates the float valve 1 in a fault-free manner with the spherical or sphere-like floats up to a particular inclination. It should be provided, however, that the abutment surface in the main body is not rotated through 40° or more in an individual case or installed in such a rotated state.

Figure 10:
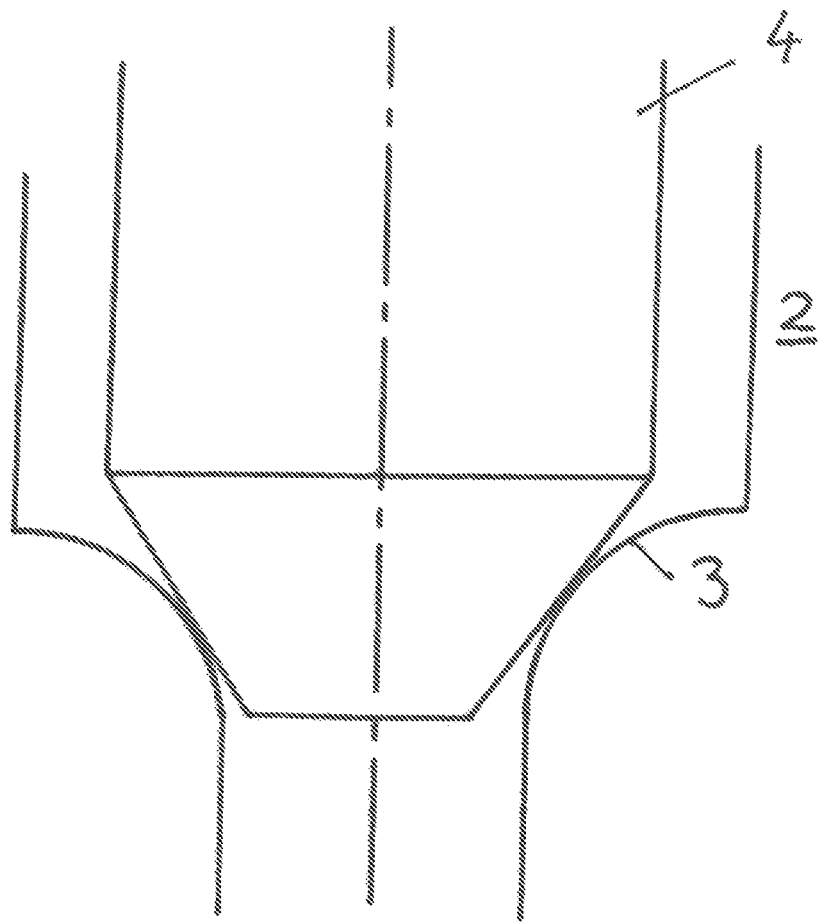
FIG. 10 shows an axial section through a fourth embodiment of the float.

FIG. 10 shows a fourth embodiment of the present invention in which the bottom side of the spherical float 4 has a conical shape, with the result that the bottom side has the shape of a conical section. The cone axis is hereby coaxial with the float axis. The annular inner wall of the valve narrowing 3 has a convex shape, with the result that the conical float bottom side abuts on the convex valve narrowing 3 in a movable manner.

The present invention is not limited to embodiments described herein; reference should be had to the appended claims.

What is claimed is:

1. A float valve for controlling a liquid level, the float valve comprising:
   a valve main body which forms a throughflow duct, the valve main body comprising a vertical tube connecting piece and a flange, the vertical tube connecting piece comprising an upper opening and an outside;
   a tubular hood which is configured to cover the upper opening of the vertical tube connecting piece, to abut on the flange, and to sealingly surround the vertical tube connecting piece on the outside;
   a valve narrowing which is formed by the throughflow duct;
   a float mounted above the valve narrowing as a valve element, the valve element being configured to be freely movable, to close the valve narrowing via its weight, and to be lifted from a valve closing position via a liquid; and
   a valve chamber which is configured to accommodate the float, the valve chamber being formed by the vertical tube connecting piece and the tubular hood,
   wherein,
   the float comprises a center of gravity which is lower than a geometric center of the float so that the float always rights itself to a standing position,
   the vertical tube connecting piece further comprises a wall which comprises vertical tube wall liquid throughflow openings, and
   the tubular hood further comprises a wall which comprises tubular hood wall liquid throughflow openings.

2. The float valve as recited in claim 1, wherein the liquid level is an oil level in a vehicle transmission.

3. The float valve as recited in claim 1, wherein the float further comprises an outer wall which has a spherical shape, a hemispherical shape, a sphere-like shape, or a conical shape.

4. The float valve as recited in claim 1, wherein,
   the float further comprises a quantity of float material and a cavity,
   the cavity is arranged above the quantity of float material, and
   the center of gravity is arranged in the float material.

5. The float valve as recited in claim 4, wherein,
   the float further comprises an upper shell and a lower shell, and
   the center of gravity is arranged in the lower shell.

6. The float valve as recited in claim 1, wherein the valve narrowing comprises an inner wall which is arranged to have a conical form or a convex form.

7. The float valve as recited in claim 1, wherein each of the vertical tube wall liquid throughflow openings and the tubular hood wall liquid throughflow openings are provided as windows.

8. The float valve as recited in claim 1, wherein the tubular hood comprises an upper roof wall which comprises tubular hood upper roof wall liquid throughflow openings.

9. The float valve as recited in claim 8, wherein each of the tubular hood upper roof wall liquid throughflow openings and the vertical tube wall liquid throughflow openings are provided with filter surfaces.

10. A method of using the float valve as recited in claim 1 in an oil-regulating system of a vehicle transmission, the method comprising:

provide the float valve as recited in claim 1; and arranging the float valve in the oil-regulating system of the vehicle transmission.

\* \* \* \* \*